US007338571B2

(12) United States Patent
Brivio et al.

(10) Patent No.: US 7,338,571 B2
(45) Date of Patent: Mar. 4, 2008

(54) METHOD OF MANUFACTURING TIRE WITH METAL STUDS

(75) Inventors: Fiorenzo Brivio, Bernareggio (IT); Ernesto Cerizza, Besana Brianza (IT)

(73) Assignee: Pirelli Pneumatici S.p.A., Milan (IT)

( * ) Notice: Subject to any disclaimer, the term of this patent is extended or adjusted under 35 U.S.C. 154(b) by 22 days.

(21) Appl. No.: 10/600,648

(22) Filed: Jun. 23, 2003

(65) Prior Publication Data

US 2004/0079471 A1   Apr. 29, 2004

Related U.S. Application Data

(63) Continuation of application No. 09/577,890, filed on May 25, 2000, now abandoned.

(60) Provisional application No. 60/137,483, filed on Jun. 4, 1999.

(30) Foreign Application Priority Data

May 26, 1999  (EP)  ................................. 99110172
Apr. 26, 2000  (EP)  ................................. 00108821

(51) Int. Cl.
*B29D 30/66* (2006.01)
(52) U.S. Cl. .......................... 156/114; 152/210; 425/3; 425/28.1; 425/DIG. 33
(58) Field of Classification Search ................ 156/114; 29/450, 235, 815; 152/210, 211; 425/3, 425/28.1, 123, DIG. 33
See application file for complete search history.

(56) References Cited

U.S. PATENT DOCUMENTS

| 1,396,293 A | 11/1921 | Sitzler |
| 2,121,956 A | 6/1938 | Eger |
| 2,171,438 A | 8/1939 | Tarbox |
| 2,770,013 A | 11/1956 | Crooker |
| 2,808,621 A | 10/1957 | Torrey, Jr. |
| 2,910,104 A | 10/1959 | Billingsley |

(Continued)

FOREIGN PATENT DOCUMENTS

DE    1505173    4/1969

(Continued)

OTHER PUBLICATIONS

Derwent Publications Ltd., London, GB; XP-002145508—JP 07 001605 (Jan. 6, 1995), "Retreaded Tyre for Icy, Snowy Roads Produced by Coating Precured Tread Having Spike Pin Holes with Adhesive, Driving Spike Pins and Heat Bonding," (Abstract Only).

(Continued)

*Primary Examiner*—Steven D. Maki
(74) *Attorney, Agent, or Firm*—Finnegan, Henderson, Farabow, Garrett & Dunner, L.L.P.

(57) ABSTRACT

A stud for vehicle tyres includes a central body, a tip connected to a first end of the central body, and a base provided on a second end of the central body. The first end of the central body is opposite the second end. The stud has at least one abutting shoulder arranged at a predefined distance from the tip. A method for manufacturing a tyre for vehicle wheels including the studs, a vulcanization mould for tyres including seats designed to retain the studs, a tyre for vehicle wheels including the studs, and a premoulded tread band containing the studs for retreading a tyre are also disclosed.

18 Claims, 4 Drawing Sheets

U.S. PATENT DOCUMENTS

| | | | |
|---|---|---|---|
| 3,237,670 A | | 3/1966 | Hutchinson |
| 3,504,414 A | * | 4/1970 | Breen .......................... 29/815 |
| 3,926,239 A | | 12/1975 | Petersons et al. |
| 4,143,209 A | | 3/1979 | Gerspacher et al. |
| 4,684,431 A | | 8/1987 | Shurman et al. |
| 5,234,326 A | | 8/1993 | Galli et al. |
| 2005/0098920 A1 | * | 5/2005 | Brivio et al. ............... 156/114 |

FOREIGN PATENT DOCUMENTS

| | | |
|---|---|---|
| DE | 1579111 | 5/1969 |
| DE | 2041166 | 2/1972 |
| FR | 1454829 | 12/1966 |
| GB | 1248891 | 10/1971 |
| IT | 1164958 | 1/1979 |
| IT | 1166684 | 3/1979 |
| JP | 58-051134 | 3/1983 |
| WO | WO 97/44205 | 11/1997 |

OTHER PUBLICATIONS

Derwent Publications Ltd., London, BG; XP-002145509—JP 54-146880 (Nov. 16, 1979), "Joining Metal to Rubber, e.g., Metal Wire in Tyres by Applying Thin Layer of Organo-Cobalt Salt Between Metal and Rubber, then Vulcanising," (Abstract Only).

Yoko; "Retreaded Tire for Iced Road and Manufacture Thereof," Patent Abstracts of Japan, JP 07-001606, (Jan. 6, 1995).

"Spikes—ein bedeutsamer Beitrag zur Verbesserung der Verkehrssicherheit," Gummibereifung, vol. 46, No. 1, pp. 66-70, Jan. 1970.

* cited by examiner

METHOD OF MANUFACTURING TIRE WITH METAL STUDS

CROSS-REFERENCE TO RELATED APPLICATION

This application is a continuation of U.S. patent application Ser. No. 09/577,890, filed May 25, 2000 now abandoned, in the U.S. Patent and Trademark Office, the contents of which are relied upon and incorporated herein by reference; additionally, Applicants claim the right of priority under 35 U.S.C. § 119(a)-(d) based on patent application No. 99110172.6, filed May 26, 1999, in the European Patent Office, and patent application No. 00108821.0, filed April 26, 2000, in the European Patent Office; additionally, Applicants claim the benefit under 35 U.S.C. § 119(e) based on prior-filed, copending provisional application No. 60/137,483, filed Jun. 4, 1999, in the U.S. Patent and Trademark Office; the contents of all of which are relied upon and incorporated herein by reference.

The present invention relates to a method for manufacturing a tyre for vehicle wheels of the type particularly suitable for travelling on icy and/or snowy roads, which is provided with a tread band containing a plurality of studs partially projecting from the radially external surface of said tread band.

BACKGROUND OF THE INVENTION

1. Field of the Invention

More precisely, the tread band is provided with a tread pattern suitable for use on snow-covered and/or icy roads and consisting of a plurality of longitudinal and transverse grooves which define a corresponding plurality of blocks and/or ribs into which the abovementioned studs are inserted so as to partially project towards the outside.

The present invention also relates to a vulcanization mould for tyres, comprising a pair of annular shaped and coaxially facing cheeks and a plurality of sectors which are circumferentially distributed around said cheeks, especially designed for manufacturing studded tyres.

The present invention also relates to a studded tyre, a pre-moulded and studded tread band and a stud for a tyre tread band.

DESCRIPTION OF THE RELATED ART

Tyres which are suitable for travelling on icy and/or snowy roads have anti-slip elements projecting from the external surface of the tread band. Said anti-slip elements, which in the remainder of the present description are simply referred to as "studs", in their usual form consist of a rigid body which is generally metallic—preferably made of steel—comprising a cylindrical stem or a stem formed by a double cone. Said stem at one end (the end in contact with the ground) is provided with a tip made of a very hard material, which is generally an alloy based on tungsten carbide, and at the other end is provided with a widened base designed to retain the stud in the tread band.

A studded tyre normally has about 400 studs.

According to a first method known in the art, the fixing of the studs is performed by forcing each stud into a respective cylindrical hole formed in the thickness of the tread band of an already cured tyre; the base of the stud, which has a diameter greater than the diameter of the stud stem, prevents the stud from coming out of its seat.

Said method requires the maximum care and must be performed by specialized technical operators in order to avoid problems of tearing or ripping of the blocks of the tyre band and of penetration of the base of the stud into the underlying belt and carcass structure, as well as subsequent loss of the studs themselves during use of the tyre.

The studs must project from the external surface of the tread band by a predetermined amount, depending on the desired performance of the tyre, but, since insertion of the studs is a manual or semi-manual operation according to said method, projection of the studs is not uniform, resulting in non-uniform engagement of the studs in the ground and premature and/or irregular wear of the stud tips.

The studded tyres obtained by said method produce good results during normal travel in a straight line, but are not very effective in particularly severe conditions, i.e. when there are intense driving or braking torques or when they are subjected to the action of high transverse forces, such as those which occur with sports type driving conditions, in particular during competitions.

In these conditions the studs manage to come out of their seats, thus being lost along the road and adversely affecting in this way the performance of the tyre.

Furthermore, the process for manufacturing studded tyres according to said method, besides being delicate as described above, is also long and costly since it is required to mould a tyre beforehand and then to insert the studs into the vulcanized tyre.

In particular, at first it is necessary to prepare, manufacture and vulcanize a tyre provided with a tread pattern suitable for the purposes. Then holes have to be drilled in the blocks of the tread pattern where the studs are to be arranged. A glue is injected into the holes and finally the studs are inserted therein.

Therefore, the adhesion of the stud to the body of the block represents the most critical aspect of this technology owing to the insufficient strength of the bond obtained between stud and block in relation to the performance required.

As described in Italian Patents N. 1,164,958 and N. 1,166,684, in the past the Applicant has arranged a particular methodology for improving the adhesion of the stud to the block consisting in using one or more layers of rubberized fabrics to be positioned around the studs. However, the abovementioned bonding problem, on account of the continuously increasing level of performance which is required to the tyres, is no longer satisfactorily solved.

In order to avoid the previously described problems associated with the above technology, German Patent DE-2,041,166 has proposed to insert the tips of the studs into blind holes provided in the wall of the vulcanization mould—before loading the latter with the green tyre—so as to incorporate and fix said studs in the tread band during moulding and vulcanization of the tyre.

More precisely, according to said method the green carcass is manufactured in any known manner, mounted on a male form and then loaded into a mould which can be horizontally and vertically disassembled into at least two parts to be pressed against the surface of the tread band so as to impart to the latter the desired tread pattern.

During vulcanization, the studs, which are inserted beforehand with force into corresponding holes formed in the various dismountable parts of the mould, are incorporated into the compound of the tread band which adheres chemically to the surface of each stud, producing a bond better than that which is obtained with the glue of the first method indicated above.

Furthermore, documents U.S. Pat. No. 2,808,621 and U.S. Pat. No. 3,237,670 describe two vulcanization moulds for producing studded tyres according to which friction elements of any suitable shape (e.g., short segments of steel spring, small stampings, chips or blocks of ferrous metal, studs with a plurality of teeth) are engaged to the moulds and temporarily maintained in the correct position therein by using a plurality of fields of magnetic attraction. More precisely, said documents disclose the use of permanent magnets inside of vulcanization moulds to temporarily hold the metallic friction elements so that these latter are transferred to and embedded in the tread portion of the tyre at predetermined positions.

SUMMARY OF THE INVENTION

The present invention arises from Applicant's perception that the reliability of the bond between stud and compound of the tread band is remarkably influenced by the method which is employed to obtain the bond between said compound and the surface of the stud, as well as by the opening step of the mould and the consequent extraction of the cured tyre.

The Applicant has perceived that, according to the known methods described above, during the extraction of the cured tyre from the mould, nearly all of the studs incorporated in the tread band are subjected to forces which damage the bonds obtained between the studs and the compound.

Previously cited documents DE-2,041,166, U.S. Pat. No. 2,808,621 and U.S. Pat. No. 3,237,670 are silent about said drawback which occurs even though modern moulds equipped with sectors of the centripetal type are used, i.e. moulds comprising two axially mutually displaceable, annular cheeks—corresponding to the side walls of the tyre—and a ring of sectors corresponding to the tread band—arranged between said cheeks and radially displaceable in both directions perpendicularly with respect to the axis of the mould.

In fact the movement of each sector with respect to the tread band is of the radial type only along the symmetry axis of the sector, whereas in the other zones of the sector said movement is parallel to the abovementioned axis and therefore in a direction which is inclined with respect to the direction perpendicular to the convex surface of the tread band.

Said phenomenon progressively increases at the points of the sector which are furthest from the axis of symmetry; in this connection it must be remembered that each sector embraces the entire axial extension of the tread and covers a circumferential tread arc of between 36° and 90°.

On the other hand, it is apparent that the studs have to be incorporated in the tread band with an orientation substantially perpendicular to the surface of the tread, so as to ensure that the tyre has an adequate performance during use.

As perceived by the Applicant, during the opening of the mould, the studs, and in particular those which are located at the furthest distance from the symmetry axis of the sector, are obliged to assume a position parallel to the abovementioned symmetry axis and therefore are subjected to a force which arranges the stud in the direction of the symmetry axis of the sector, causing flexing of the block and discharging onto the side surface of the stud shearing forces which adversely affect the reliability of the bonding between stud and block resulting in the loss of studs, already during extraction of the tyre from the mould and/or in the tearing of the tyre blocks during use.

The Applicant has perceived that said drawbacks can be overcome by inserting the studs into corresponding seats of the mould which ensure a sufficient degree of clearance between seats and studs so that to allow the studs to keep their orientation, perpendicular to the surface of the tread band, during the opening of the mould, once vulcanization has been completed.

Therefore, according to a first aspect thereof, the present invention relates to a method for manufacturing a tyre for vehicle wheels, of the type suitable for travelling on icy and/or snowy roads, said tyre comprising a tread band having an external surface containing a plurality of metal studs partially projecting from said external surface, comprising the steps of:

manufacturing a green tyre;
   inserting and retaining said studs into specific seats provided in a vulcanization mould;
   inserting said green tyre into said mould;
   closing said mould;
   vulcanizing said green tyre;
   opening said mould to extract the cured tyre, characterized in that the step of opening the mould is carried out providing that the studs incorporated into the tread band of the cured tyre do not scrape on the walls of said mould, said seats maintaining their substantially perpendicular arrangement with respect to the external surface of said tread band.

In particular, the step of retaining the studs into said seats is performed by using a magnetic attraction force.

Preferably, the method comprises the step of chemically treating said studs with a bonding agent prior to their insertion into said mould.

Even more preferably, said method comprises the step of providing said studs with a coating layer, e.g. brass or an alloy containing Cu, Zn, Ni, Co, or Mn, obtained by electroplating or by electrolytic plating.

According to a second aspect thereof, the present invention relates to a vulcanization mould for tyres, comprising:

a pair of annularly shaped and coaxially facing cheeks;
   a plurality of sectors circumferentially distributed around said cheeks;
   a plurality of seats which are provided in said sectors, each of said seats being designed to retain a corresponding stud, characterized in that said seats are provided, with respect to said studs, with a degree of clearance to allow the cured tyre to be extracted from the mould, at the opening of the latter, without interference between said seats and said studs to maintain their substantially perpendicular arrangement with respect to the external surface of the tread band.

Preferably, each seat contains a bush whose internal surface (i.e., the surface which is directed towards the cavity of the mould) is intended to come into contact with an annular abutting shoulder provided on the body of said studs.

Preferably, said stud is retained in a predefined position inside the corresponding seat by means of a magnet which is provided in each seat.

According to a third aspect thereof, the present invention relates to a stud for tyres of vehicle wheels, of the type suitable for providing said tyres with optimum road-holding properties on icy and/or snowy roads, comprising:

a central body;
   a tip connected to said central body at a first end thereof;
   a base provided on said central body at a second end axially opposite with respect to said tip, characterized in that said central body has at least one abutting shoulder arranged at a predefined distance from said tip.

Preferably said studs are chemically treated with a bonding agent.

More preferably said studs are provided with a brass coating.

According to a fourth aspect thereof, the present invention relates to a studded tyre for vehicle wheels, of the type suitable for travelling on icy and/or snowy roads, comprising a tread band which has a radially external surface and contains a plurality of studs partially projecting from said external surface, characterized in that said studs are bonded to the compound of said tread band by means of a bonding agent provided on the bare body of said studs.

Preferably the chemical adhesion between studs and tread band compound is obtained by brass plating the bare body of the studs.

According to a fifth aspect thereof, the present invention relates to a pre-moulded tread band, for covering worn tyres, of the type suitable for allowing said re-treaded tyres to be used for travelling on icy and/or snowy roads, said tread band having a bottom surface for assembly with said tyre and a top surface for rolling contact with the road, characterized in that it comprises a plurality of studs partially projecting from said top surface, said studs being bonded to the compound of said tread band by means of chemical adhesion obtained with a bonding agent applied onto the bare body of the stud so as to allow bonding between said tread band and said studs prior to said assembly of tread band and tyre.

Preferably said chemical adhesion is obtained by brass plating the bare body of the studs.

BRIEF DESCRIPTION OF THE DRAWINGS

Further features and advantages will emerge more clearly from the detailed description of a preferred, but not exclusive embodiment of the different aspects of the present invention. This description will be illustrated hereinbelow with reference to the accompanying drawings provided solely for the purposes of illustration and therefore of a non-limiting example, in which:

FIG. 2b-shows an enlarged view of a detail of the cross right section of FIG. 2a;

DETAILED DESCRIPTION OF THE PREFERRED EMBODIMENTS

Figure 1:
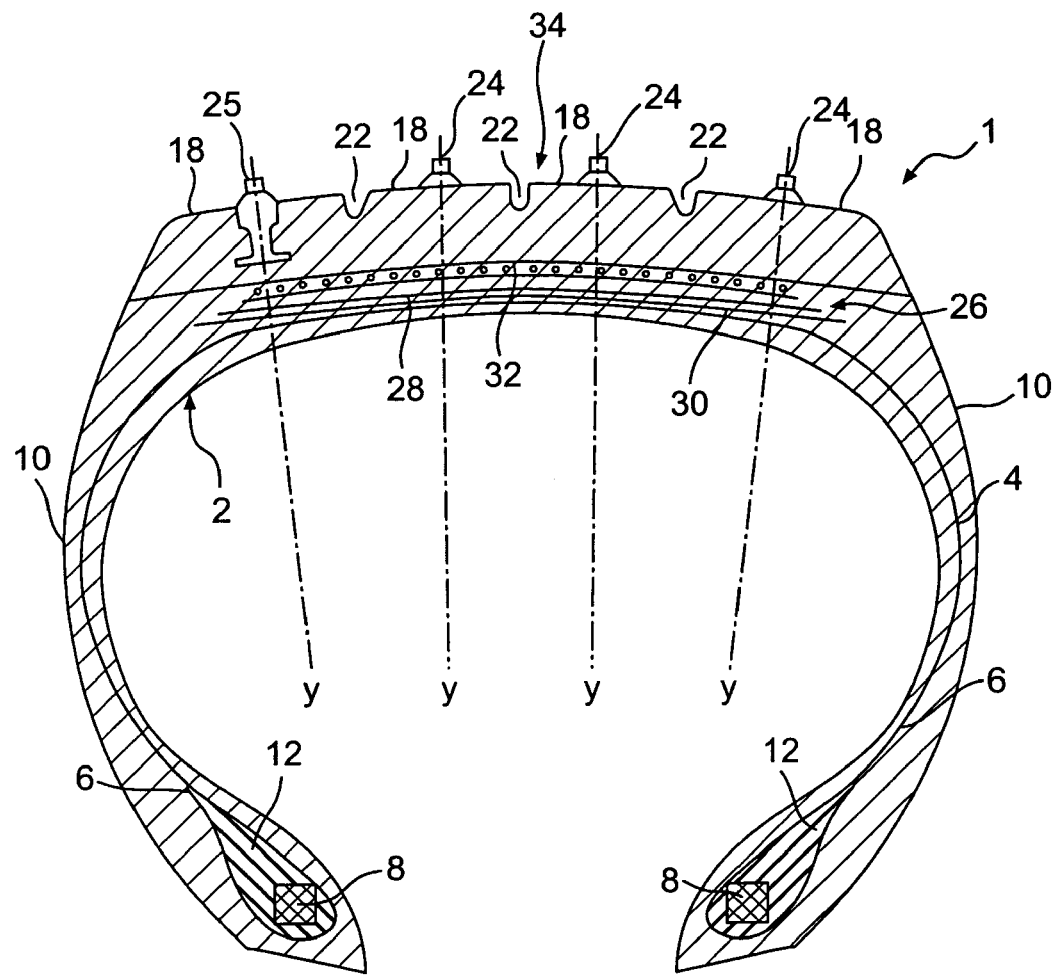
FIG. 1 shows a cross right section through a studded tyre according to the present invention.

With reference to FIG. 1, reference sign 1 indicates, in its entirety, a studded tyre according to the present invention.

Tyre 1 comprises a torus-shaped carcass 2, of the radial or of the cross-ply type, comprising a resistant structure which is formed by at least a rubberized fabric ply 4 reinforced with textile or metal cords and having its ends 6 each fixed to a circumferentially unextendable, preferably metallic, annular core, known and referred to hereinbelow as reinforcing bead core 8. Said bead core 8 is provided on its radially external surface with a rubber filling element 12. As is known, the zone of the tyre comprising bead core 8 and filling element 12 forms the bead which is intended for fixing tyre 1 to a corresponding mounting rim, not shown.

Carcass 2 has arranged on it, in a known manner, a tread band 34 which is intended for the rolling contact of the tyre on the ground and is provided with a raised pattern comprising grooves 22 which are formed in the thickness of said tread band and define a plurality of blocks and/or ribs 18. The combination of these structural elements, in various configurations, produces different tread patterns which are generally optimized for the different applications of the tyre.

Together with the carcass of the radial type, tyre 1 also comprises a belt structure 26 which is arranged on the crown of carcass 2, in between carcass ply 4 and tread band 34, substantially extending from one side to the other of the tyre, i.e. as wide as tread band 34, and comprising at least two rubberized fabric strips 28 and 30 which are radially superimposed and provided with textile or metallic reinforcing cords which are parallel to one another in each layer, mutually intersecting with those of the adjacent layer and with respect to the equatorial plane of the tyre. Preferably, belt structure 26 also comprises a radially outermost strip 32 provided with textile or metallic reinforcing cords, oriented at 0°, i.e. in a circumferential direction with respect to the tyre.

The thickness of the tread band, in tyres for cars, is normally between 14 mm and 18 mm and more preferably between 15 mm and 16 mm.

The compound of the tyre tread band is of the type well known to persons skilled in the art and is suitably selected for winter usage, in particular involving studded tyres.

Tread band 34 has, inserted in it, as anti-slip elements, a plurality of studs, some of which are shown in FIG. 1 with reference number 24, in which only the part projecting from the external surface of tread band 34 can be seen. The whole body of only one stud, indicated by reference sign 25, is shown.

It can be noted that, for reasons of curvature of the external surface of the tread band, the studs, which are perpendicular to said surface, are not arranged parallel to one another but along axes y converging radially towards the inside of the tyre.

As indicated above, a mould of the centripetal type, which is used for moulding and curing radial-carcass tyres, comprises two side portions of an annular shape-referred to as "cheeks"—which are coaxially facing, axially and mutually displaceable with respect to each other and substantially corresponding to the sidewalls 10 of said tyre, not shown since not particularly relevant for the purposes of the present invention. A central annular portion is arranged between said cheeks and comprises a plurality of sectors arranged between said cheeks and comprises a plurality of sectors (usually varying from 4 to 10) which are circumferentially arranged around the axis of the mould and are radially displaceable in both the directions perpendicularly with respect to said axis. These sectors are designed to act on the tread band of the tyre so as to define thereon a so-called tread pattern. For this purpose, on their internal surfaces designed to come into contact with the tread band, they are provided with a plurality of protrusions 222 so as to produce longitudinal and/or transverse grooves defining the ribs and/or the blocks of the desired tread pattern.

As for the cheeks, if it is required to form raised portions on the side walls of the tyre, for example, in order to provide for graphic elements identifying the tyre itself (e.g., trade name or tyre size), said cheeks are usually provided with corresponding cavities designed to produce said raised portions.

Vulcanization of the tyre is performed preferably at a temperature of about 150° C.-180° C. and applied for a period of time of between 20-45 minutes in the presence of a pressure of the vulcanization fluid, introduced inside the tyre, of about 28 bar.

In accordance with the present invention, the mould for a studded tyre, such as that shown in FIG. 1, has a plurality of holes (about 400) provided in each sector of the mould and designed to retain the studs in a predefined position during incorporation in the compound of the tread band and curing of the tyre; in particular said holes are suitably shaped so as to avoid the rising of undesired forces during the opening of the mould, acting on said studs and/or on the blocks or ribs of the tread band around said studs as a consequence of any interference between the studs and the walls of the holes.

Figure 2A:
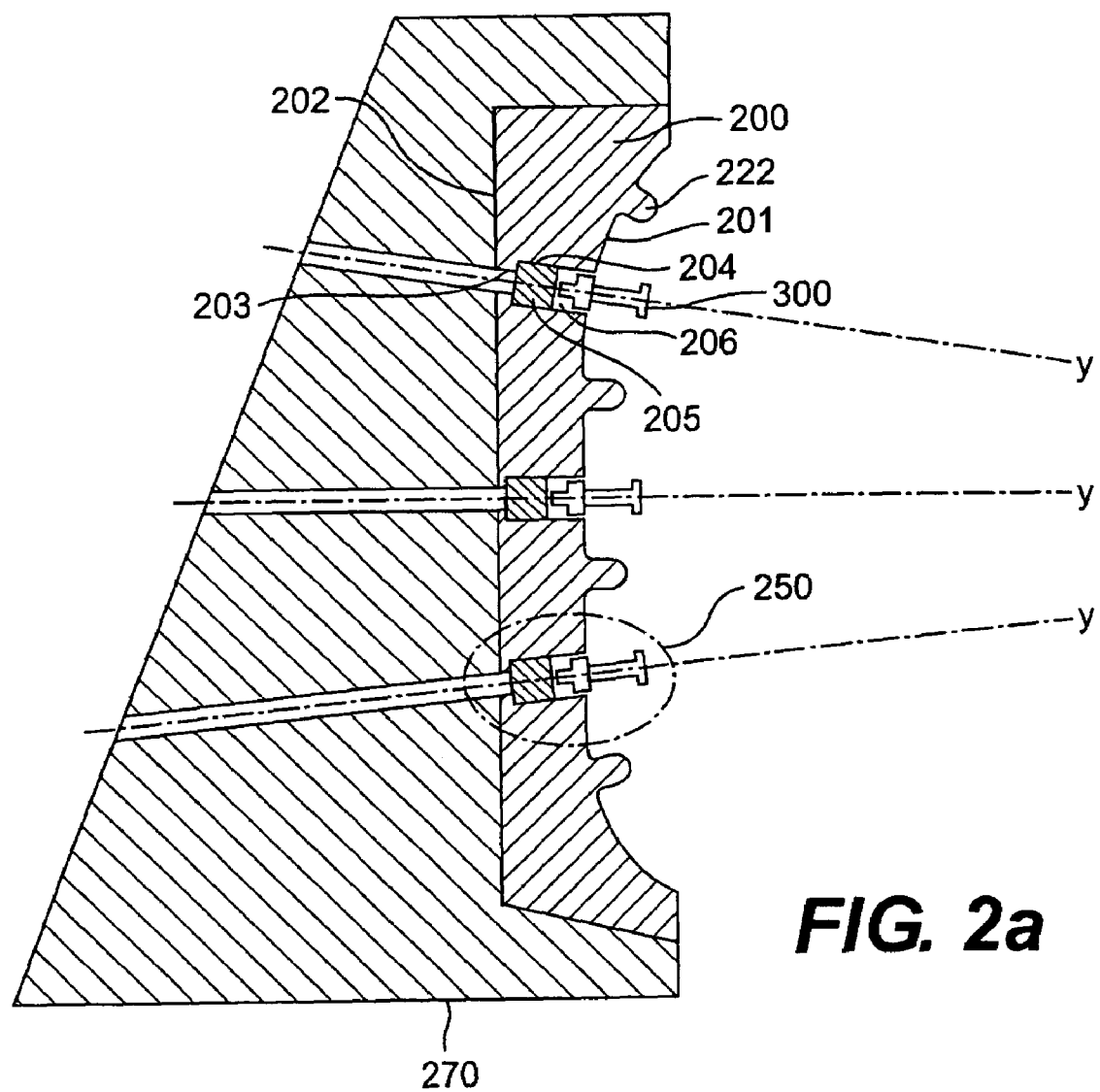
FIG. 2a shows a cross right section through a sector of the vulcanization mould according to the present invention.
Figure 2B:
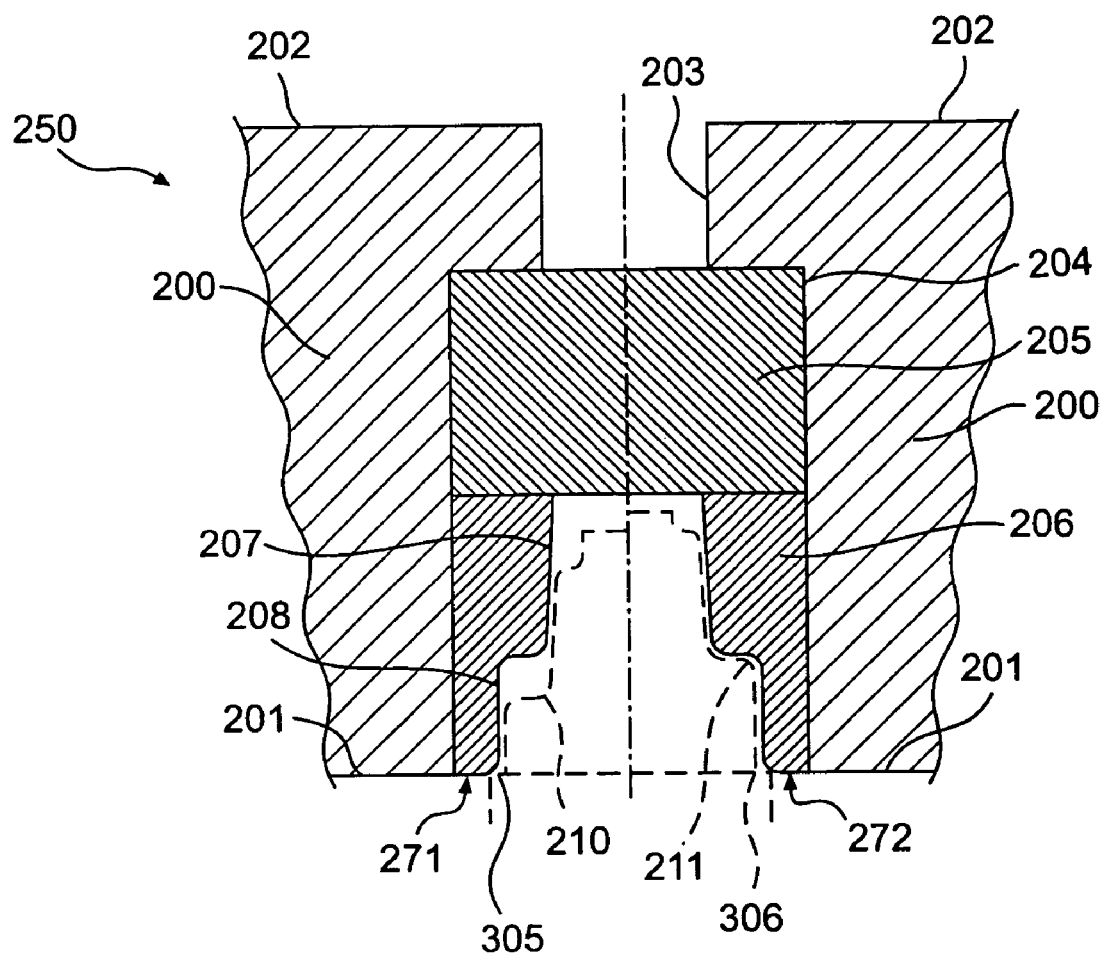

In more details, FIG. 2*a* shows a cross right section through a sector 270 of a centripetal mould according to the present invention and FIG. 2*b* shows an enlarged cross right section view of detail 250 of FIG. 2*a*, said detail 250 relating to a seat designed to retain a stud according to the present invention.

In the description and in the accompanying drawings, structurally or functionally equivalent elements will be indicated by the same reference signs.

Reference sign 200 represents the portion—called "matrix"—of sectors 270 which provides for the raised pattern on the tread band. Therefore, matrix 200 is interchangeable according to the desired tread pattern to be provided on a given tyre.

Reference sign 201 indicates the internal surface of matrix 200, i.e. the matrix surface which faces the mould cavity, and reference sign 202 indicates the external surface of matrix 200, i.e. the matrix surface opposite to internal surface 201.

Matrix 200, which is preferably made of aluminium, has a plurality of through-holes each possessing a first portion 203 and a second portion 204. First portion 203 is formed in the vicinity of external surface 202, with a first bore diameter (for example 5 mm), while second portion 204 is formed in the vicinity of internal surface 201, with a second bore diameter (for example 10 mm) greater than the first diameter.

Inside second portion 204 is positioned a cylindrically shaped magnet 205 having a diameter value corresponding substantially to the hole diameter (e.g., 10 mm) and a height of between 5 mm and 10 mm, and preferably equal to 10 mm. The used magnet is, for example, of the cobalt samarium type with a maximum energy product (BH MAX-MG) of between 27 Oe and 30 oe, a residual induction (Br) of between 10800 Gauss and 11500 Gauss, and a coercive field (Hc) of between 10000 Oe and 11000 Oe.

Magnet 205 is arranged so as to abut against the surface resulting from the variation in diameter between first portion 203 and second portion 204.

A bush 206, preferably made of non-magnetizable stainless steel, is then inserted inside second portion 204.

Bush 206 is substantially annular in shape and presents a first internal portion 207, with a slightly conical shape, and a second internal portion 208, with a cylindrical shape.

First internal portion 207 has an inner diameter of 4.2 mm in the vicinity of magnet 205 and an inner diameter of 4.7 mm in the vicinity of said second internal portion 208, over a length of 4.3 mm.

Second portion 208 has an inner diameter of between 6.8 mm and 7.4 mm, preferably equal to 7.0 mm and a length preferably of 3.7 mm.

Bush 206 has an outer diameter equal to that of second portion 204 of the through-hole so that, once inserted, it is locked inside second portion 204 by means of interference; moreover, preferably, in order to obtain a greater gripping effect, at least a portion of the external surface of bush 206 is knurled.

Figure 3:
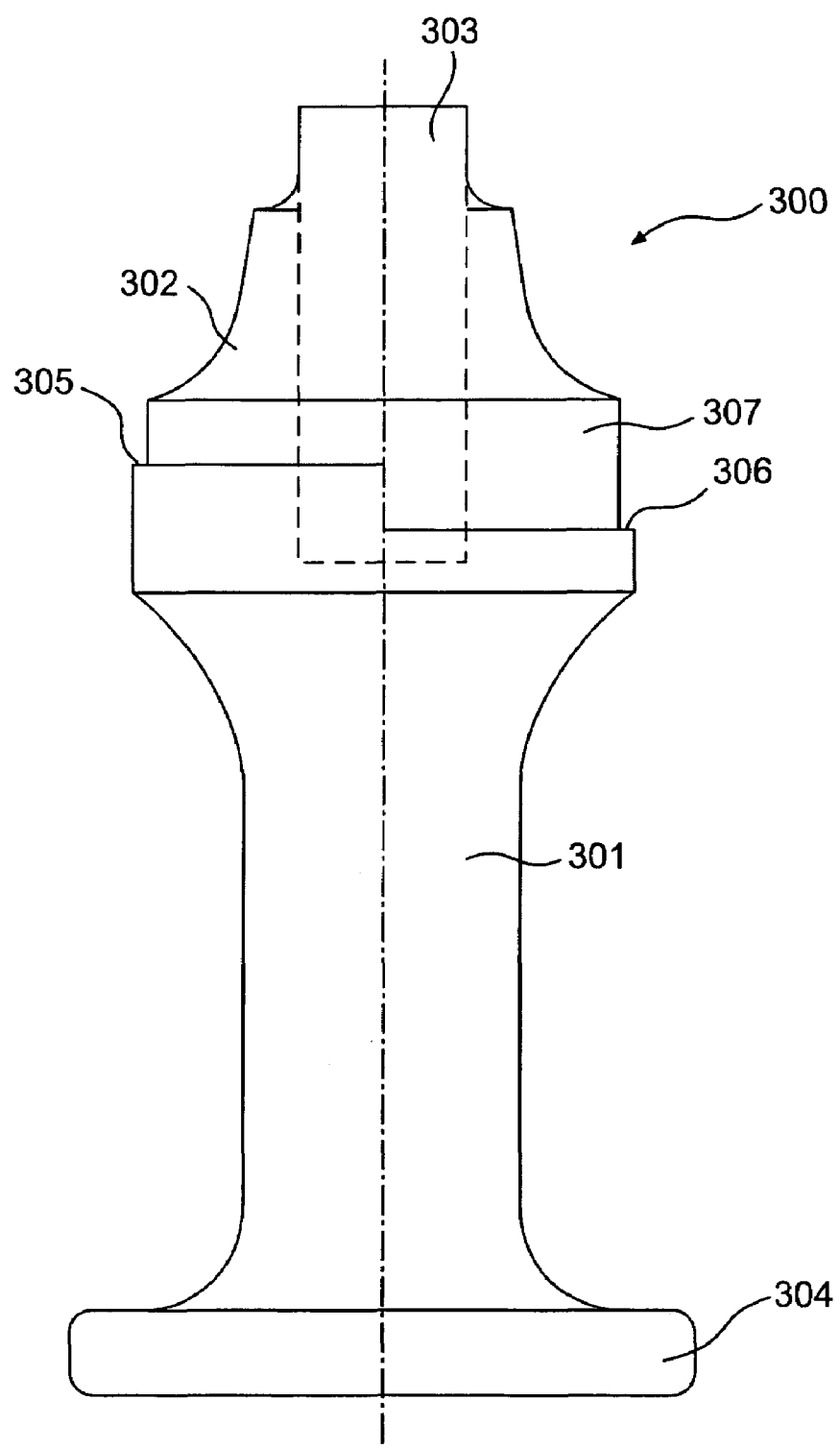
FIG. 3 shows a partially sectioned side view of a stud according to the present invention.

FIG. 3 shows a stud 300 according to the present invention, comprising a central body 301, consisting of a rigid element preferably made of steel and, in any case, for the purposes of the present invention, made of a ferromagnetic metallic material (for example of the type CF17 SMnPb10, UNI 4838/90).

Furthermore, stud 300 has a cylindrical end portion 302—more preferably a tapered end portion—which is intended to project from the radially external surface of the tread band.

Said end portion 302 is advantageously provided with a tip 303 consisting of a small bar of hard metal, for example tungsten carbide, inserted inside said end portion 302 and designed to exert a tractional force on snow-covered and/or icy roads. For example, tip 303 can be joined to body 301 by means of braze welding.

At the opposite end of said tip 303, stud 300 comprises a base 304 which is preferably circular and has a diameter greater than any other diameter of central body 301. Stud portion lying between end portion 302 and base 304 can possess, along its axial extension, one or more annular shoulders or collars (not shown) provided with a diameter substantially equivalent to that of base 304. Said collars have the function to obtain a firmer gripping action of stud 300 inside tread band 34.

According to the present invention, stud 300 has a portion 307 of substantially cylindrical shape which is located between end portion 302 and central body 301.

Generally, said portion 307 is divided into two different zones: a first one which is connected to central body 301 and has the same diameter of the latter, and a second zone which is connected to end portion 302 and has a diameter lower than that of the first zone. Said two different zones of portion 307 define an annular abutting shoulder which is located at a predefined distance from the external end of tip 303. In accordance with specific performance properties required for a given tyre, the distance of said abutting shoulder from the external end of tip 303 can be suitably chosen. In fact, as described in detail in the following description, varying the distance of said abutting shoulder from the external end of tip 303 implies a variation in the length of the stud part which emerges from the external surface of tread band 34 and contacts the ground.

Stud 300 illustrated in FIG. 3 shows a portion 307 consisting of two cylindrical elements of different diameter values which give rise to a resultant annular abutting shoulder. For the sake of illustration, in FIG. 3 said abutting shoulder is shown in two separate positions 305, 306 along the axis of the stud, the position identified by reference sign 305 being located at a distance from the tip of the stud lower than that indicated by reference sign 306. Abutting shoulder 305, 306 is substantially perpendicular to the axis of the stud.

By way of example the dimensions of a stud 300 in accordance with the present invention are as follows:
- diameter of tip 303 equal to 2.5 mm;
- diameter of cylindrical body 307 above abutting shoulder 305, 306 ranges between 6.5 mm and 7.0 mm, and preferably is equal to 6.8 mm;
- diameter of cylindrical body 307 below abutting shoulder 305, 306 ranges between 7.2 mm and 7.6 mm, and preferably is equal to 7.4 mm;

distance from the external end of tip 303 to the start of cylindrical body 307 equal to 4.5 mm;

distance from the external end of tip 303 to the end of cylindrical body 307 (start of body 301) equal to 7.5 mm;

distance of abutting shoulder 305, 306 from the external end of tip 303, ranging between 5.5 mm and 8 mm;

diameter of base 304 equal to 9 mm;

height of base 304 equal to 1.3 mm;

height of stud 300 equal to 19.8 mm.

From the foregoing, it emerges that, preferably, abutting shoulder 305, 306 is 0.6 mm wide. Generally, said abutting shoulder is between 0.2 mm and 1.1 mm wide.

According to a first embodiment, after undergoing cleaning, for example by means of sandblasting and/or phosphating, stud 300 is treated with a bonding agent, preferably by means of immersion, in order to increase the adhesion between the compound of the tread band and the external surface of the stud, during vulcanization of the tyre. The Applicant has obtained good results with the product marketed by the company Henkel under the name Chemosil®.

Furthermore, according to a second embodiment of the present invention, in order to ensure a very good adhesion to the elastomeric material of the tread band, stud 300 is generally coated with one or more layers of a suitable material. The preferred coating material is brass, although other coating materials, such as alloys containing Cu, Zn, Ni, Co or Mn, can be used. In the preferred case a brass coating is used, adhesion is particularly favoured by the formation during vulcanisation of bisulphide bridges (—S—S—) between the elastomeric matrix of the tread band and the copper, which is a component of brass. Methods which can be employed for coating a stud with a brass layer are, for instance, plating or diffusion. The first comprises electrolytic plating of copper and zinc, while the second comprises electro-plating of one or more layers of copper on the stud followed by the electro-plating of a layer of zinc and by a thermal treatment that diffuses the zinc in the copper layers, thus forming a brass layer. Studs are, preferably, brass-coated with a metal composition consisting of from 30% to 40% by weight in zinc and from 70% to 60% by weight in copper, to form a layer of brass which is from 1 µm to 2 µm, preferably equal to 1.5 µm, in thickness.

Furthermore, in order to promote adhesion between tread band and stud a variety of metallic salts or other additives as an ingredient in the rubber composition can be employed. For instance, a preferred adhesion promoting additive is an organometallic complex based on boron and cobalt, the latter being linked together through oxygen. Said complex is commercially known with the tradename of Manobond 680C® and is generally used in combination with a high amount of sulphur.

A further adhesion—promoting additive is a resorcin/hexa-methoxy-methyl-melamine (HMMM) system, which is generally used in combination with a mediumllow amount of sulphur. Resorcin and HMMM react together and give rise to a layer interposed between the rubber blend and the metallic stud, said layer promoting the adhesion with the rubber and protecting the metal from aging, sulphur attack, and/or moisture.

Moreover, it is also possible to use together an organometallic complex based on boron and cobalt and a resorcin/HMMM system, generally in combination with a high amount of sulphur. Silica can also be used since it is known that, in general, it promotes the adhesion of rubber to metals.

During assembly of stud 300 inside the mould, abutting shoulder 305, 306 of stud 300 is placed against end edges 271, 272 of second portion 208 of bush 206, said end edges 271, 272 being at the same level of internal surface 201 of matrix 200.

FIG. 2b shows in broken lines, by way of illustration, the profiles of two stud samples. In details, left profile 210 represents a stud 300 with an abutting shoulder 305, and right profile 211 represents a stud 300 with an abutting shoulder 306. The distance between abutting shoulder 305, 306 and the external end of tip 303 corresponds to the length of the stud part which emerges from the external surface of tread band 34.

Advantageously, with a single bush 206, it is possible to use studs with an abutting shoulder located at different distances from tip 303, said different distances corresponding to different values of the projecting portion of stud 300 from the external surface of the tread band. For example, with the bush measurements described above, it is possible to obtain a projection of between 5.5 mm and 6.5 mm. The dimensions of the bush have been determined so that tip 303 never comes into contact with magnet 205 and the magnetic field continuously exerts its attractive force on the stud. It can be noted that it is preferred that the studs do not come into contact with the corresponding magnets in order to provide an easy detachment of the cured tyre from the mould.

The annular abutting shoulder 305, 306 of stud 300 allows the studs to be arranged and retained inside associated bushes 206 in an exactly predefined position. This makes possible to achieve a much more uniform projection of the studs from the tread band when compared to the projection of known art.

The shape and internal dimensions of bushing 206 are designed to be adapted to the shape and the dimensions of the top part of stud 300, i.e., tip 303, end portion 302, and cylindrical portion 307.

In particular, the inner diameter of second internal portion 208 of bush 206 (in the example equal to 7 mm) is preferably slightly greater than the diameter of cylindrical portion 307 of stud 300 above abutting shoulder 305, 306 (in the example equal to 6.8 mm) so that the stud has a predefined degree of clearance inside its seat. Thanks to said clearance, during the opening of the mould each sector 270 can be moved away from the stud with a direction that is inclined with respect to the axis of the stud. In this way the stud is not subjected to any flexural stress nor subjected to traction caused by friction against the wall of the bush. As a consequence, the bonding interface between the tread band compound and the stud surface is not altered.

Moreover, in order to further reduce the flexural forces, which the studs may be subjected to during opening of the mould, it is preferable to use moulds with a large number of sectors, for example 12. By using sectors with circumferentially smaller dimensions, the maximum distances between the axes of the studs and the axis of symmetry of the sector are also reduced.

The tolerances in the measurements of magnet 205, bush 206 and second portion 204 of the throughhole are determined so that magnet 205 and in particular bush 206, once they have been inserted into second portion 204, are fixed in their seats. For the purposes of maintenance and/or replacement, it is possible to remove said parts by forcing them, by using suitable means applied to the magnet, through first portion 203 of the through-hole.

Studs 300 are inserted into the appropriate seats in the mould, i.e. into bushes 206, and held in position by the force of magnet 205. The magnetic force generated by individual magnet 205 is able to retain each stud 300 in its predefined position during moulding of the tyre, i.e. during incorporation of the stud into the thickness of the tread band, although the force exerted by all the magnets present in one mould on the corresponding studs has not to prevent extraction of the vulcanized tyre from the mould.

After insertion of the studs into the bushes, the green tyre is loaded into the mould and then moulded and vulcanized.

The compound of the tread band, which at the start of the vulcanization cycle becomes plastic, arranges itself homogeneously around the studs, enveloping them.

The compounds which are suitable for the tread bands of studded tyres do not have a great power of adhesion with the metal materials forming the core of the stud. Therefore, the stud is treated with a chemical agent or is provided with a coating layer which acts as an interface, creating a very strong bond between the metal and the compound. In this way each stud is made wholly integral with the block of the tread pattern containing it.

A tyre in accordance with the present invention was subjected to a tearing test which consists in applying to the tip of the stud an increasing moment and measuring the value needed to pull out the stud from the corresponding block. The values of the moment applied to the stud were very much higher than those for the tyres according to the state of the art; moreover, it was possible to determine that pulling no longer occurs as a result of detachment of the stud from the compound, but owing to tearing of the compound itself, namely pulling of the block from the tread pattern in which the stud is fixed.

The studded tyre according to the invention presents a high degree of adhesion between the stud and the compound of the tread band, said aspect resulting in a remarkable decrease of studs loss in comparison with studded tyres of the prior art used in the same operating conditions, i.e. pressure, load, road conditions.

Furthermore, according to the studded tyre of the present invention the known tears in the compound during insertion of the stud into the tread band are avoided and uniform projection of the studs from the external surface of the tread band is achieved.

This also results in simplifying the production of the studded tyres and reducing production times.

According to the present invention, opening of the mould and removing of the sectors from the cured tyre do not create stresses which are abnormal and damage the studs embedded in the tread band.

Moreover, with a mould provided in accordance with the present invention, it is possible to drastically reduce or even eliminate the air vents normally provided in the mould in order to allow the air trapped inside it during the closing step to escape. The air, in fact, is able to escape through the gaps which are created between the studs, the bushes and the magnets; air bubbles which remain between the stud and the compound, in particular on the surface of the tread band, are thus avoided.

By way of alternative to magnet 205 and bush 206, as means designed to retain the stud during vulcanization, it is possible to use other devices for effecting retaining, for example by means of creation of an air vacuum outside the mould so as to exert a sucking action on the studs, keeping them with the annular abutting shoulder against the surface of the bush, or also a mechanical resilient retaining device (clip or spring) located inside the hole.

The present invention is also applicable to so-called re-treaded or remould tyres, both those which are obtained by applying onto the worn carcass of the tyre a new green tread band, with subsequent moulding and vulcanization as described above, and those obtained by applying onto the worn carcass, by means of suitable adhesives, a pre-moulded and pre-vulcanized tread band.

This tread band is normally moulded and vulcanized in a flat mould, by arranging an elongated strip of elastomer between two radially superimposed plates, one of which—preferably the underlying one—has formed on it the pattern of the tread band. The two plates are moved towards each other, by applying a suitable pressure and temperature, so as to mould and vulcanize the tread band.

In accordance with the present invention the plate on which the pattern of the tread band is formed can comprise the magnets and the bushes which are seated in appropriate holes, as in the case of the sectors described above: the studs are inserted beforehand in the abovementioned holes and these remain firmly incorporated in the moulded and vulcanized tread band.

Furthermore, the Applicant has found that suitable curing cycles have to be arranged in order to avoid an excessive curing of the blend in the proximity of the brassed studs of the present invention due to the presence of sulphur of the brass plating of the studs. In this respect, the Applicant has obtained good results by using curing cycles of about 25 or 30 minutes at a temperature of 160° C., i.e. with curing cycles of lower values in temperature and/or time with respect of the corresponding cycles of the prior art.

The invention claimed is:

1. A method for manufacturing a tyre for vehicle wheels, comprising the steps of:
   producing a tyre;
   inserting a plurality of metal studs into seats provided in a vulcanization mould;
   retaining the plurality of metal studs in the seats;
   inserting the tyre into the mould;
   closing the mould;
   vulcanizing the tyre; and
   opening the mould to extract the vulcanized tyre;
   wherein the tyre comprises a tread band,
   wherein the mould includes means for retaining the plurality of studs in the seats,
   wherein, during the step of opening the mould, a predefined degree of clearance exists between lateral portions of each of the plurality of metal studs and one of the respective seats,
   wherein a design of the mould allows the plurality of metal studs to partially project from an external surface of the tread band of the vulcanized tyre,
   wherein the plurality of metal studs are oriented in a substantially perpendicular arrangement with respect to an external surface of the tread band,
   wherein the predefined degree of clearance is such that during the step of opening the mould, the plurality of metal studs maintain the substantially perpendicular arrangement,
   wherein the retaining means includes a magnet, which exerts a magnetic force, such that the studs are retained by said magnetic force, and
   wherein an abutting shoulder of each stud engages the internal surface of the mould such that the stud never comes into contact with the magnet.

2. The method of claim 1, further comprising chemically treating the studs with a bonding agent prior to inserting the plurality of metal studs.

3. The method of claim 1, further comprising providing the studs with one or more coating layers.

4. The method of claim 3, wherein at least one of the one or more coating layers is brass or an alloy comprising cobalt, copper, manganese, nickel, or zinc.

5. The method of claim 3, wherein at least one of the one or more coating layers comprises a brass coating layer provided by electrolytic plating.

6. The method of claim 3, wherein at least one of the one or more coating layers comprises a brass coating layer provided by electro-plating.

7. A method for manufacturing a tyre for a vehicle wheel, comprising:
produces a tyre;
inserting a plurality of metal studs into seats provided in a vulcanization mould;
retaining the plurality of metal studs in the seats;
inserting the tyre into the mould;
closing the mould;
vulcanizing the tyre; and
opening the mould to extract the vulcanized tyre;
wherein the tyre comprises a tread band,
wherein the mould includes means for retaining the plurality of studs in the seats,
wherein, during opening the mould, the plurality of metal studs are not subjected to any flexural stress,
wherein a design of the mould allows the plurality of metal studs to partially project from an external surface of the tread band of the vulcanized tyre,
wherein the plurality of metal studs are oriented in a substantially perpendicular arrangement with respect to the external surface,
wherein, during opening the mould, the plurality of metal studs maintain the substantially perpendicular arrangement,
wherein the retaining means includes a magnet, which exerts a magnetic force, such that the studs are retained by said magnetic force, and
wherein an abutting shoulder of each stud engages the internal surface of the mould such that the stud never comes into contact with the magnet.

8. The method of claim 7, further comprising chemically treating the studs with a bonding agent prior to inserting the plurality of metal studs.

9. The method of claim 7, further comprising providing the studs with one or more coating layers.

10. The method of claim 9, wherein at least one of the one or more coating layers is brass or an alloy comprising cobalt, copper, manganese, nickel, or zinc.

11. The method of claim 9, wherein at least one of the one or more coating layers comprises a brass coating layer provided by electrolytic plating.

12. The method of claim 9, wherein at least one of the one or more coating layers comprises a brass coating layer provided by electro-plating.

13. A method for manufacturing a tyre for a vehicle wheel, comprising:
producing a tyre;
inserting a plurality of metal studs into seats provided in a vulcanization mould;
retaining the plurality of metal studs in the seats;
inserting the tyre into the mould;
closing the mould;
vulcanizing the tyre; and
opening the mould to extract the vulcanized tyre;
wherein the tyre comprises a tread band,
wherein the mould includes means for retaining the plurality of studs in the seats,
wherein, during opening the mould, the plurality of metal studs are not subjected to traction caused by friction against the seats,
wherein a design of the mould allows the plurality of metal studs to partially project from an external surface of the tread band of the vulcanized tyre,
wherein the plurality of metal studs are oriented in a substantially perpendicular arrangement with respect to the external surface,
wherein, during opening the mould, the plurality of metal studs maintain the substantially perpendicular arrangement,
wherein the retaining means includes a magnet, which exerts a magnetic force, such that the studs are retained by said magnetic force, and
wherein an abutting shoulder of each stud engages the internal surface of the mould such that the stud never comes into contact with the magnet.

14. The method of claim 13, further comprising chemically treating the studs with a bonding agent prior to inserting the plurality of metal studs.

15. The method of claim 13, further comprising providing the studs with one or more coating layers.

16. The method of claim 15, wherein at least one of the one or more coating layers is brass or an alloy comprising cobalt, copper, manganese, nickel, or zinc.

17. The method of claim 15, wherein at least one of the one or more coating layers comprises a brass coating layer provided by electrolytic plating.

18. The method of claim 15, wherein at least one of the one or more coating layers comprises a brass coating layer provided by electro-plating.

* * * * *